April 26, 1960 W. E. HOLMES 2,933,877
HAY RAKING AND BALING MACHINE
Filed May 14, 1958 3 Sheets-Sheet 1

INVENTOR.
Wilbur E. Holmes

April 26, 1960
W. E. HOLMES
2,933,877
HAY RAKING AND BALING MACHINE
Filed May 14, 1958
3 Sheets-Sheet 2
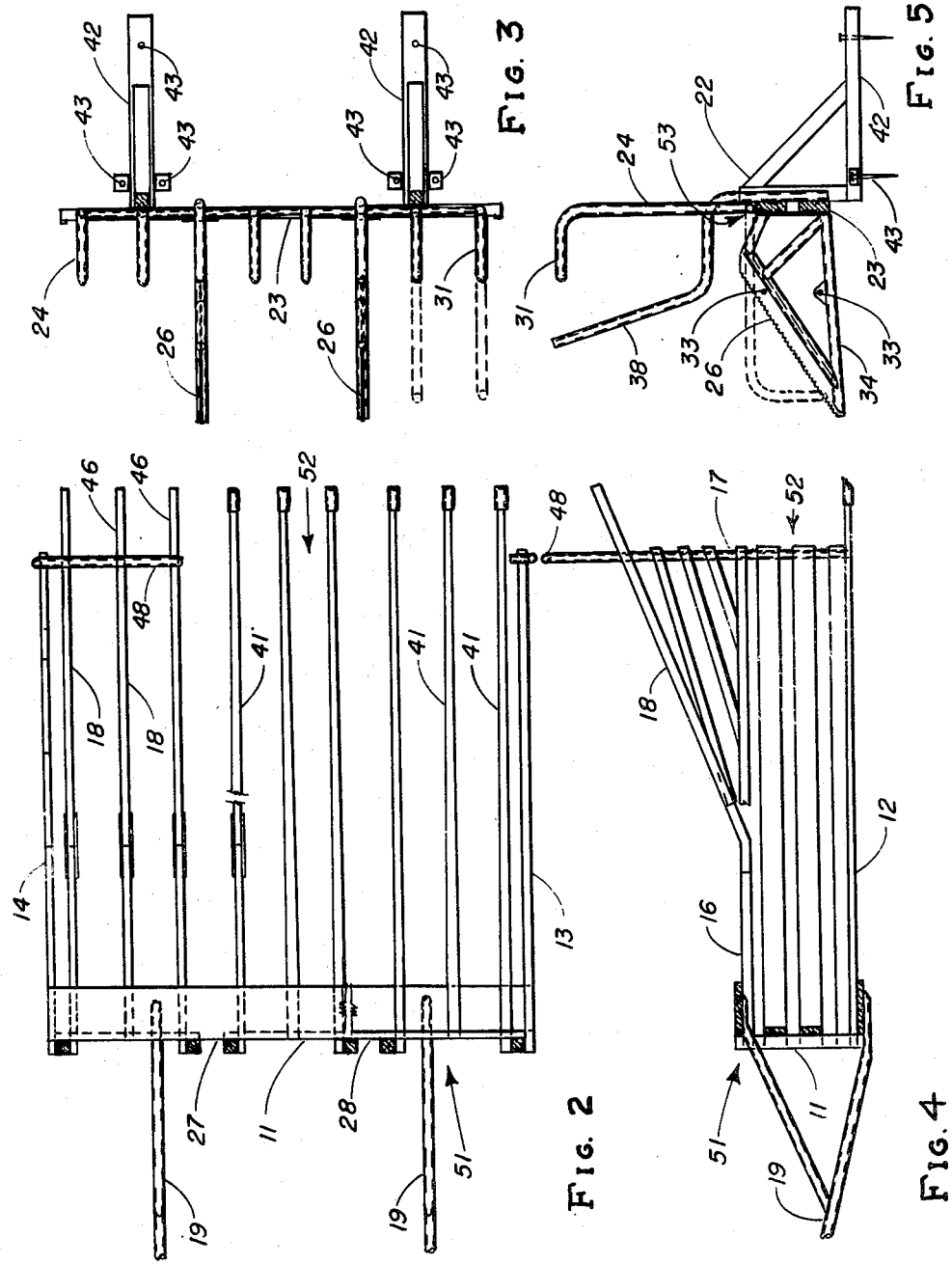
INVENTOR.
Wilbur E. Holmes

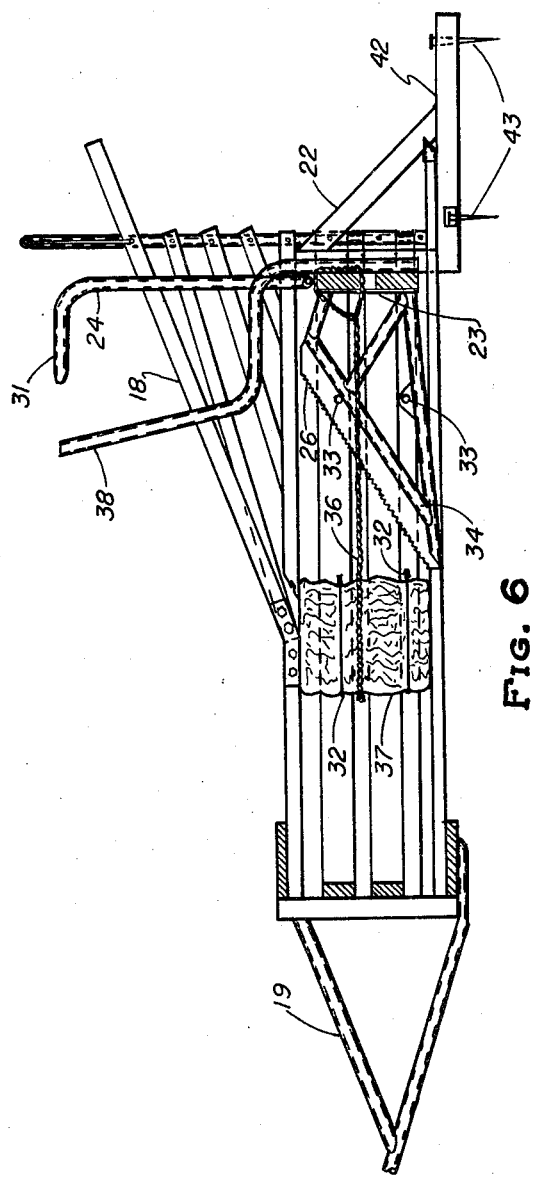

ent invention with portions broken away and shown op-
United States Patent Office 2,933,877
Patented Apr. 26, 1960

2,933,877

HAY RAKING AND BALING MACHINE

Wilbur Eugene Holmes, Oakland, Calif.

Application May 14, 1958, Serial No. 735,290

5 Claims. (Cl. 56—341)

The invention relates to agricultural machinery and more particularly to such machinery designed for gathering and compacting hay into bale form.

An object of the present invention is to provide a machine of the character described which is designed for use as an attachment to and adjunct of a tractor which will utilize the power and maneuverability of the tractor in gathering and compacting the hay into bales.

Another object of the present invention is to provide a machine of the character described which will be relatively simple and inexpensive to manufacture and yet rugged in construction and capable of furnishing a long and trouble-free life.

A further object of the present invention is to provide a machine of the character above which may be easily and conveniently operated by one man.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 2 is a plan view of one part of the machine with parts broken away.

Figure 3 is a plan view of another part of the machine.

Figure 4 is a side elevation of the part of the machine illustrated in Figure 2.

Figure 5 is a side elevation of the part of the machine illustrated in Figure 3.

Figure 6 is a cross-sectional view of both parts of the machine in partially assembled position as in use.

Figure 1:
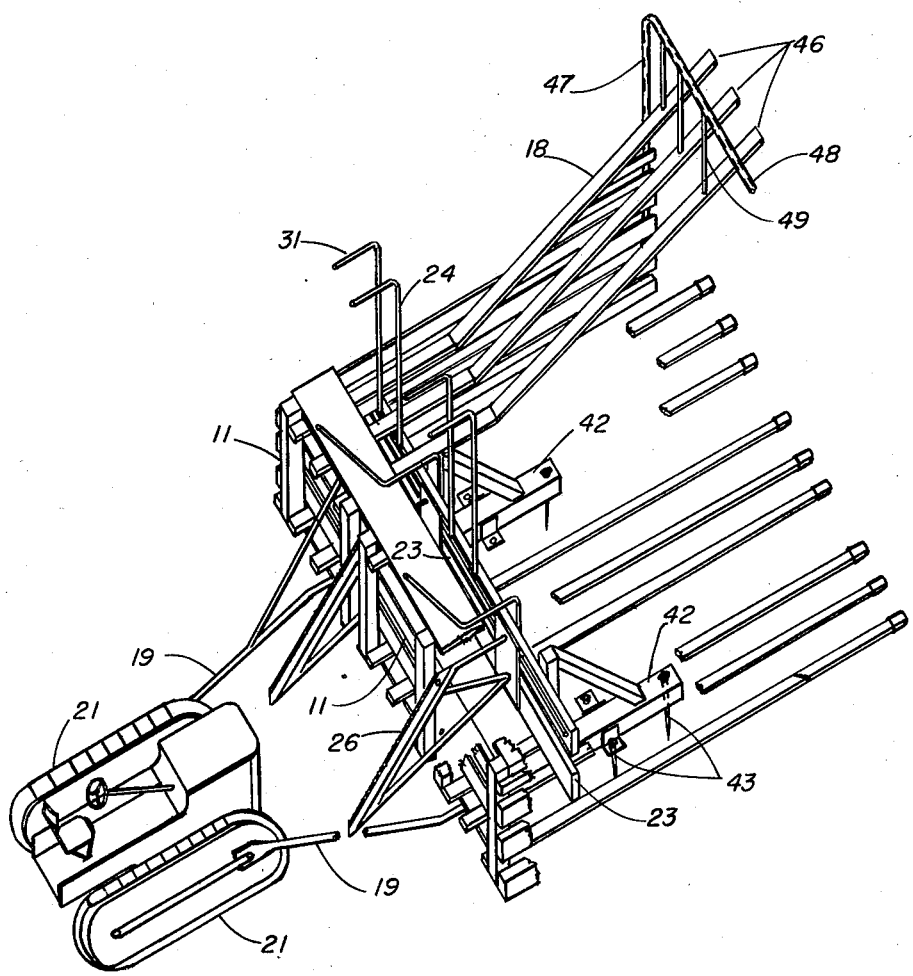
Figure 1 is a perspective view of a hay raking and baling machine constructed in accordance with the present invention with portions broken away and shown operatively connected to a tractor.

The hay raking and baling machine of the present invention consists briefly of an open ended box-like enclosure 51 as depicted in Figures 2 and 4 having a rear wall 11, a bottom wall 12, side walls 13 and 14, top wall 16, and an open forward end 17, the top wall 16 being composed of a plurality of spaced forwardly extending and upwardly inclined elongated members 18, means 19, for mounting the enclosure to the front of a tractor 21 with the open end 17 foremost to provide a scoop 52 for gathering a mass of hay, and a stationary abutment 22 adapted for anchoring to the ground and having a wall section 23 approximately equal in size to the rear wall 11, and a plurality of upstanding members 24 horizontally spaced as seen in Figure 3 to mesh with the top members 18 upon advancing of the enclosure to the abutment as depicted in Figures 1 and 6 so as to compact the hay in the enclosure for compression between the rear wall 11 and the wall section 23.

Preferably the overall width of the machine is such as to form several hay bales and one or more cutting members 26 are mounted in advance of the abutment 22 so as to cut and subdivide the hay mass into bales. As here shown, these cutting members are in the form of saw blades mounted obliquely as seen in Figure 5 and in vertical planes perpendicular to the wall section 23 as seen in Figure 3 for intersecting the hay mass within the enclosure and cutting and subdividing it into three separate bales. As will be observed from Figure 5, these saw blades extend quite a way forwardly from the wall section 23 and the rear wall 11 of the enclosure is provided with a plurality of vertical slot portions 27 and 28 which are aligned with the saw blades 26 and dimensioned to pass the saw blades through the slot portions upon compression of the hay into bales.

As another feature of the present invention, the vertical members 24 are pivoted as seen in Figure 5 adjacent the top 53 of the wall section 23, so as to swing downwardly to substantial horizontal position and are formed with perpendicularly offset portions 31 which depend in the horizontal position of the members so as to enter the hay mass and serve as abutments for compressing sections of a bale. The offset ends 31 may be swung down into different sections of the hay to serve as holding and compressing prongs during the compressing operation and thus different thicknesses of hay may be successively compressed into a bale as completed. When the two parts are fully closed as seen in Figure 1, wires 32 may be placed around the bales to bind the hay. If desired, these wires may be mounted on the stationary unit in advance of the baling operation so as to be partially positioned around the bales and conveniently positioned for the operator to complete the encircling and binding of the bale. For this purpose, wire holding guides 33 may be carried by the mounting structure 34 for the saw blades. After compaction of the hay as above described, the baling wire carried in the guides 33 may be conveniently removed by the operator to complete the encircling of the bales, and if desired, and as here shown in Figure 6, a chain 36 secured to the abutment 22 may be looped around the hay bales 37 to retain them in an accessible position upon backing off of the enclosure unit.

In approaching the stationary unit of the machine, the operator of the tractor may align the enclosure at the front of the tractor with the abutment so as to properly mesh the top members 18 and upright members 24 by sighting on two upright guide members 38 which are here positioned for this purpose directly over the two saw blades 26. As the moveable rake unit moves in to mesh and through the abutment 22, the hay is compressed by reason of the inclined runs of the top members 18, and this compression takes place directly over the saw blades which progressively cut the hay mass, as it is compressed, into the separate bales. To permit this movement of the box-like enclosure unit past the abutment 22, the wall secton 23 of the abutment is elevated as seen in Figure 5 so as to pass thereunder the bottom wall 12 of the enclosure. Preferably this bottom wall is composed of a plurality of horizontally spaced forwardly extending elongated rake members 41. The spacing between these bottom rake members 41 is such as to cause certain of them to straddle and thereby pass a pair of ground planks 42, see Figures 3 and 5, forming part of the supporting structure for the abutment and which may be anchored as by stakes 43 to the ground. As will also be observed from Figure 3, the width of the abutment unit is such as to pass into the open forward end 17 and into the interior of the box-like enclosure unit. In order to support the open forward ends 46 of the top members 18, is provided an open end frame 47 at the open end of the enclosure unit including an elevated horizontal top piece 48 from which the top members 18 may be suspended by vertical supporting members 49. The elevation of top piece 48 is somewhat higher than the upper ends 31 and the upright members 24 and hence the ends 31 will pass under the top piece 48 in the telescoping of the two units together and in this operation the upright members 24 will pass between the vertical supporting members 49.

In the interests of lightness of weight consistent with required strength, the balance of the enclosure unit, that is, the side and end walls may be fabricated as an open frame work as illustrated in the drawings. The openness of the structure also aids the operator in the manual wire encircling of the hay bales as above explained.

I claim:

1. A hay raking and baling machine comprising, an open ended box-like enclosure having rear, bottom, side and top walls and an open forward end, the top wall being composed of a plurality of spaced forwardly extending and upwardly inclined elongated members, means connected to said enclosure for mounting said enclosure at the front of a tractor with said open end foremost to provide a scoop for gathering a mass of cut hay, and a stationary abutment disposed facing said open end of said enclosure and adapted for anchoring to the ground and having a wall section approximately equal in size to said rear wall and a plurality of upstanding members horizontally spaced to mesh with said top members upon advancing said enclosure to said abutment so as to compact the hay in said enclosure for compression between said rear wall and said wall section.

2. A hay raking and baling machine comprising, an open ended box-like enclosure having rear, bottom, side and top walls, and an open forward end, said top wall being composed of a plurality of spaced forwardly extending and upwardly inclined elongated members, means connected to said enclosure for mounting said enclosures at the front of a tractor with said open end foremost to provide a scoop for gathering a mass of cut hay, a stationary abutment disposed facing said open end of said enclosure and adapted for anchoring to the ground and having a wall section approximately equal in size to said rear wall and a plurality of upstanding members horizontally spaced to mesh with said top members upon advancing said enclosure to said abutment so as to compact the hay in said enclosure for compression between said rear wall and said wall section, and a cutting member mounted in advance of said abutment and on the side thereof facing said enclosure to cut and subdivide said hay into bales.

3. A hay raking and baling machine comprising, an open ended box-like enclosure having rear, bottom, side and top walls and an open forward end, said top wall being composed of a plurality of spaced forwardly extending and upwardly inclined elongated members, means connected to said enclosure for mounting said enclosure at the front of a tractor with said open end foremost to provide a scoop for gathering a mass of cut hay, a stationary abutment disposed facing said open end of said enclosure and adapted for anchoring to the ground and having a wall section approximately equal in size to said rear wall and a plurality of upstanding members horizontally spaced to mesh with said top members upon advancing said enclosure to said abutment so as to compact the hay in said enclosure for compression between said rear wall and said wall section, and a plurality of saw blades mounted obliquely in vertical planes perpendicular to said wall section and on the side thereof facing said enclosure for cutting and subdividing said hay into a plurality of bales.

4. A hay raking and baling machine as characterized in claim 3 wherein said rear wall is formed with a plurality of vertical slot portions aligned with said saw blades and dimensioned to pass said saw blades therethrough upon compression of said hay into bales.

5. A hay raking and baling machine comprising, an open ended box-like enclosure having rear, bottom, side and top walls and an open forward end, said top wall being composed of a plurality of spaced forwardly extending and upwardly inclined elongated members, means connected to said enclosure for mounting said enclosure at the front of a tractor with said open end foremost to provide a scoop for gathering a mass of cut hay, and a stationary abutment disposed facing said open end of said enclosure adapted for anchoring to the ground and having a wall section approximately equal in size to said rear wall and a plurality of upstanding members horizontally spaced to mesh with said top members upon advancing said enclosure to said abutment so as to compact the hay in said enclosure for compression between said rear wall and said wall section into a bale, said vertical members being pivoted adjacent the top of said wall section to swing downwardly to substantially horizontal position and being formed with substantially perpendicularly offset end portions depending in said horizontal position to enter said hay mass and to serve as an abutment for compressing sections of a bale.

References Cited in the file of this patent

UNITED STATES PATENTS

| | | |
|---|---|---|
| 1,817,361 | Garretson | Aug. 4, 1931 |
| 2,185,794 | Lewis | Jan. 2, 1940 |
| 2,656,663 | Stauffer | Oct. 27, 1953 |
| 2,677,323 | O'Konski | May 4, 1954 |
| 2,822,086 | Franks | Feb. 4, 1958 |